(12) United States Patent
Barnes (10) Patent No.: US 12,491,086 B2
(45) Date of Patent: Dec. 9, 2025

(54) STATIONARY WEDGE EXPANDABLE INTERBODY DEVICE

(71) Applicant: K2M, Inc., Leesburg, VA (US)

(72) Inventor: Liam Patrick Barnes, Leesburg, VA (US)

(73) Assignee: VB Spine US Opco LLC, Leesburg, VA (US)

( * ) Notice: Subject to any disclaimer, the term of this patent is extended or adjusted under 35 U.S.C. 154(b) by 258 days.

(21) Appl. No.: 18/038,605

(22) PCT Filed: Nov. 24, 2021

(86) PCT No.: PCT/US2021/060708
§ 371 (c)(1),
(2) Date: May 24, 2023

(87) PCT Pub. No.: WO2022/115520
PCT Pub. Date: Jun. 2, 2022

(65) Prior Publication Data
US 2024/0091024 A1  Mar. 21, 2024

Related U.S. Application Data

(60) Provisional application No. 63/117,701, filed on Nov. 24, 2020.

(51) Int. Cl.
*A61F 2/44* (2006.01)
*A61F 2/30* (2006.01)

(52) U.S. Cl.
CPC .... *A61F 2/447* (2013.01); *A61F 2002/30331* (2013.01); *A61F 2002/30383* (2013.01); *A61F 2002/30411* (2013.01)

(58) Field of Classification Search
None
See application file for complete search history.

(56) References Cited

U.S. PATENT DOCUMENTS

| 5,658,335 A | 8/1997 | Allen |
| 6,821,298 B1 * | 11/2004 | Jackson ................ A61F 2/4455 623/17.11 |
| 8,105,382 B2 | 1/2012 | Olmos et al. |
| 8,382,842 B2 | 2/2013 | Greenhalgh et al. |

(Continued)

FOREIGN PATENT DOCUMENTS

| KR | 102120254 B1 * | 6/2020 | ......... A61F 2/30767 |
| KR | 20200025453 A * | 10/2020 | |

OTHER PUBLICATIONS

International Search Report and Written Opinion issued in Appln. No. PCT/US2021/060708 dated Mar. 11, 2022 (12 pages).

*Primary Examiner* — Jan Christopher L Merene
(74) *Attorney, Agent, or Firm* — Lerner David LLP (57) ABSTRACT

An intervertebral implant includes a chassis and endplates movable relative to the chassis. The endplates are each movable between a contracted position, wherein the endplates are nearer to a central axis defined relative to the chassis, and an expanded position, wherein the endplates are farther from the central axis. The chassis includes at least one wedge that, in turn, includes surfaces along which the endplates travel in transition between the contracted and expanded positions. The wedge remains stationary relative to the central axis throughout transitions between the contracted and expanded positions.

20 Claims, 4 Drawing Sheets

(56) References Cited

U.S. PATENT DOCUMENTS

| | | | |
|---|---|---|---|
| 10,869,769 B2* | 12/2020 | Eisen | A61F 2/4455 |
| 2003/0065396 A1 | 4/2003 | Michelson | |
| 2005/0177235 A1* | 8/2005 | Baynham | A61F 2/447 |
| | | | 623/17.11 |
| 2006/0058876 A1* | 3/2006 | McKinley | A61F 2/4455 |
| | | | 623/17.11 |
| 2008/0033440 A1* | 2/2008 | Moskowitz | A61B 17/92 |
| | | | 606/251 |
| 2011/0172774 A1* | 7/2011 | Varela | A61F 2/447 |
| | | | 623/17.16 |
| 2013/0158664 A1 | 6/2013 | Palmatier et al. | |
| 2014/0249629 A1 | 9/2014 | Moskowitz et al. | |
| 2017/0209282 A1* | 7/2017 | Aghayev | A61F 2/447 |
| 2017/0290674 A1 | 10/2017 | Olmos et al. | |
| 2018/0036138 A1* | 2/2018 | Robinson | A61F 2/4611 |
| 2018/0200075 A1* | 7/2018 | Baker | A61F 2/4611 |
| 2018/0318101 A1* | 11/2018 | Engstrom | A61F 2/4425 |
| 2019/0254836 A1* | 8/2019 | Cowan | A61F 2/447 |
| 2020/0163775 A1 | 5/2020 | Kim et al. | |
| 2020/0179131 A1 | 6/2020 | Kraus | |
| 2020/0352731 A1* | 11/2020 | Berry | A61F 2/447 |
| 2021/0378832 A1* | 12/2021 | Altarac | A61F 2/447 |

* cited by examiner

STATIONARY WEDGE EXPANDABLE INTERBODY DEVICE

CROSS-REFERENCE TO RELATED APPLICATIONS

This application is a national phase entry under 35 U.S.C. § 371 of International Application No. PCT/US2021/060708, filed on Nov. 24, 2021, which claims the benefit of the filing date of U.S. Provisional Patent Application No. 63/117,701, filed Nov. 24, 2020, the disclosure of which is hereby incorporated herein by reference.

BACKGROUND

Intervertebral implants are commonly used in spinal surgery, such as in interbody fusion procedures, in which an implant (e.g., a spacer or cage) is placed in the disc space between two vertebrae to be fused together. At least a portion of the disc is typically removed before the implant is positioned in the intervertebral space, and the implant may be supplemented with bone graft material to promote fusion of the vertebrae. Interbody fusion procedures may also be performed in conjunction with other types of fixation, such as pedicle screw fixation, to provide additional stability, particularly while the vertebrae fuse together.

Some such intervertebral implants often have an initially contracted configuration, such that they have a low profile in the superior-inferior direction, in order to ease insertion into the intervertebral space. Such expandable implants can then be expanded in the superior-inferior direction after implantation, so as to securely engage and stabilize the vertebrae on both sides of the intervertebral space.

BRIEF SUMMARY

BRIEF DESCRIPTION OF THE DRAWINGS

According to an aspect of the present disclosure, an intervertebral implant may transition between a contracted configuration and an expanded configuration by movement of endplates included by the implant. The implant may include wedges at fixed locations relative to one another and a drive system operable to move the endplates along the wedges. The implant may thus be convertible between the contracted configuration and the expanded configuration by driving the endplates along the wedges.

The drive system may include a shaft rotatable about a central axis of the implant and collars threaded onto the shaft. The collars may each be connected to one or more endplates in a manner that causes the endplates to be driven when rotation of the shaft moves the collars while permitting the endplates to move relative to the collars along at least one axis. Thus, the endplates may be drivable along the wedges by moving the collars toward or away from the wedges. The shaft may include portions threaded in opposite directions so that rotation of the shaft moves collars on different portions of the shaft in different directions. The wedges may be oriented in opposed directions as well such that using the shaft to drive the collars, and thus the endplates, in opposite directions parallel to the central axis will cause all of the endplates to travel to wider or narrower portions of their respective wedges simultaneously.

In another aspect, an intervertebral implant may comprise a chassis including a wedge, and an endplate connected to the chassis. The endplate may be movable relative to the chassis along a surface of the wedge between a contracted position and an expanded position, the expanded position being farther from a central axis defined relative to the chassis than the contracted position. The wedge may remain at a constant position along the central axis in both the expanded position and contracted position.

In further arrangements according to any of the foregoing, the implant may comprise a threaded shaft in threaded driving engagement with the endplate, and connected to the chassis such that the shaft extends along and is rotatable about the central axis.

In further arrangements according to any of the foregoing, the endplate may be a first endplate, and the implant may further comprise a second endplate with which the threaded shaft is in threaded driving engagement such that rotation of the shaft about the central axis drives the first endplate and second endplate in a same direction along the central axis.

In further arrangements according to any of the foregoing, the second endplate may be connected to the chassis and movable relative to the chassis along another surface of the wedge between a contracted position and an expanded position, the expanded position of the second endplate being farther from the central axis than the contracted position of the second endplate.

In further arrangements according to any of the foregoing, the implant may comprise an internally threaded collar that may be threadingly engaged with the shaft, translatable relative to the wedge, and connected to the first endplate and second endplate to provide the threaded driving engagement of the shaft with the first endplate and second endplate.

In further arrangements according to any of the foregoing, the wedge may be a first wedge, and the collar may be a first collar threaded onto a first threaded portion of the shaft. The chassis may further include a second wedge, and the implant may further include a third endplate and fourth endplate and a second collar. The third endplate and the fourth endplate may be connected to the chassis and movable relative to the chassis along a respective surface of the wedge between a respective contracted position and a respective expanded position. The respective expanded positions may be farther from the central axis than the respective contracted positions. The second collar may be threaded onto a second threaded portion of the shaft, translatable relative to the second wedge, and connected to the third endplate and fourth endplate to provide threaded driving engagement of the shaft with the third endplate and the fourth endplate.

In further arrangements according to any of the foregoing, the first threaded portion may be threaded in an opposite direction from the second threaded portion.

In further arrangements according to any of the foregoing, the implant may comprise an internally threaded collar threadingly engaged with the shaft, translatable relative to the wedge, and connected to the endplate to provide the threaded driving engagement of the shaft with the endplate.

In further arrangements according to any of the foregoing, the endplate may be able to translate relative to the collar farther in a direction perpendicular to the central axis than in a direction parallel to the central axis.

In further arrangements according to any of the foregoing, a connection between the endplate and the collar may permit the endplate and the collar to translate relative to one another in a direction orthogonal to the longitudinal axis but prevents the endplate and the collar from translating relative to one another parallel to the central axis.

In further arrangements according to any of the foregoing, the endplate may include a track extending perpendicular to the central axis and the collar includes a peg received in the track.

In further arrangements according to any of the foregoing, the implant may be configured for the track and peg to travel along the central axis along with the collar.

In another aspect, an intervertebral implant may comprise a chassis including two wedges at fixed locations relative to one another, and a plurality of endplates each connected to the chassis. The endplates may be movable relative to the chassis along a respective surface of either of the wedges between a contracted configuration of the implant and an expanded configuration of the implant, the endplates being farther from a central axis defined relative to the implant in the expanded configuration than in the contracted configuration.

In further arrangements according to any of the foregoing, the endplates may be further from each other in the expanded configuration than in the contracted configuration.

In further arrangements according to any of the foregoing, the implant may comprise a first collar to which a first group of the endplates are connected and a second collar to which a second group of the endplates are connected, the first and second collars being translatable along the central axis relative to the chassis.

In further arrangements according to any of the foregoing, the first collar and second collar may be constrained to translate simultaneously and in opposite directions along the central axis.

In further arrangements according to any of the foregoing, the two wedges may be a first wedge and a second wedge, and wherein the surfaces of the first wedge along which endplates of the plurality of endplates are movable mirror surfaces of the second wedge along which endplates of the plurality of endplates are movable.

In further arrangements according to any of the foregoing, the implant may comprise a shaft extending along the central axis and rotatable about the central axis relative to the chassis. The first collar may be threaded onto a first threaded portion of the shaft and the second collar may be threaded onto a second threaded portion of the shaft; the second portion being threaded in an opposite direction from the first portion.

In further arrangements according to any of the foregoing, each endplate of the plurality of endplates may be connected to the respective surface of either of the wedges along which the endplate may move such that the endplate is constrained to moving only along the respective surface.

In further arrangements according to any of the foregoing, the plurality of endplates may be four endplates, two of the four endplates being a distal pair of endplates and two of the four endplates being a proximal pair of endplates.

In further arrangements according to any of the foregoing, wherein the distal pair of endplates may be at more distal positions and the proximal pair of endplates may be at more proximal positions in the expanded configuration than in the contracted configuration.

In further arrangements according to any of the foregoing, the two endplates of the distal pair of endplates may be on opposite sides of the central axis from one another and the two endplates of the proximal pair of endplates are on opposite sides of the central axis from one another.

In further arrangements according to any of the foregoing, the chassis may include two rods extending parallel to the central axis to hold the wedges at their respective fixed positions.

DETAILED DESCRIPTION

When referring to specific directions and planes in the following disclosure, it should be understood that, as used herein, the term "proximal" means closer to the operator/surgeon, and the term "distal" means further away from the operator/surgeon. The term "anterior" means toward the front of the body or the face, and the term "posterior" means toward the back of the body. With respect to the longitudinal axis of the spine, the term "superior" refers to the direction towards the head, and the term "inferior" refers to the direction towards the pelvis and feet. The "transverse plane" is that plane which is orthogonal to the longitudinal axis of the spine. The "coronal plane" is a plane that runs from side to side of the body along the longitudinal axis of the spine and divides the body into anterior and posterior portions. The "sagittal plane" is a plane that runs along the longitudinal axis of the spine and defines a plane of symmetry that separates the left and right sides of the body from each other. Finally, the "medial" refers to a position or orientation toward the sagittal plane, and lateral refers to a position or orientation relatively further from the sagittal plane.

Figure 1:
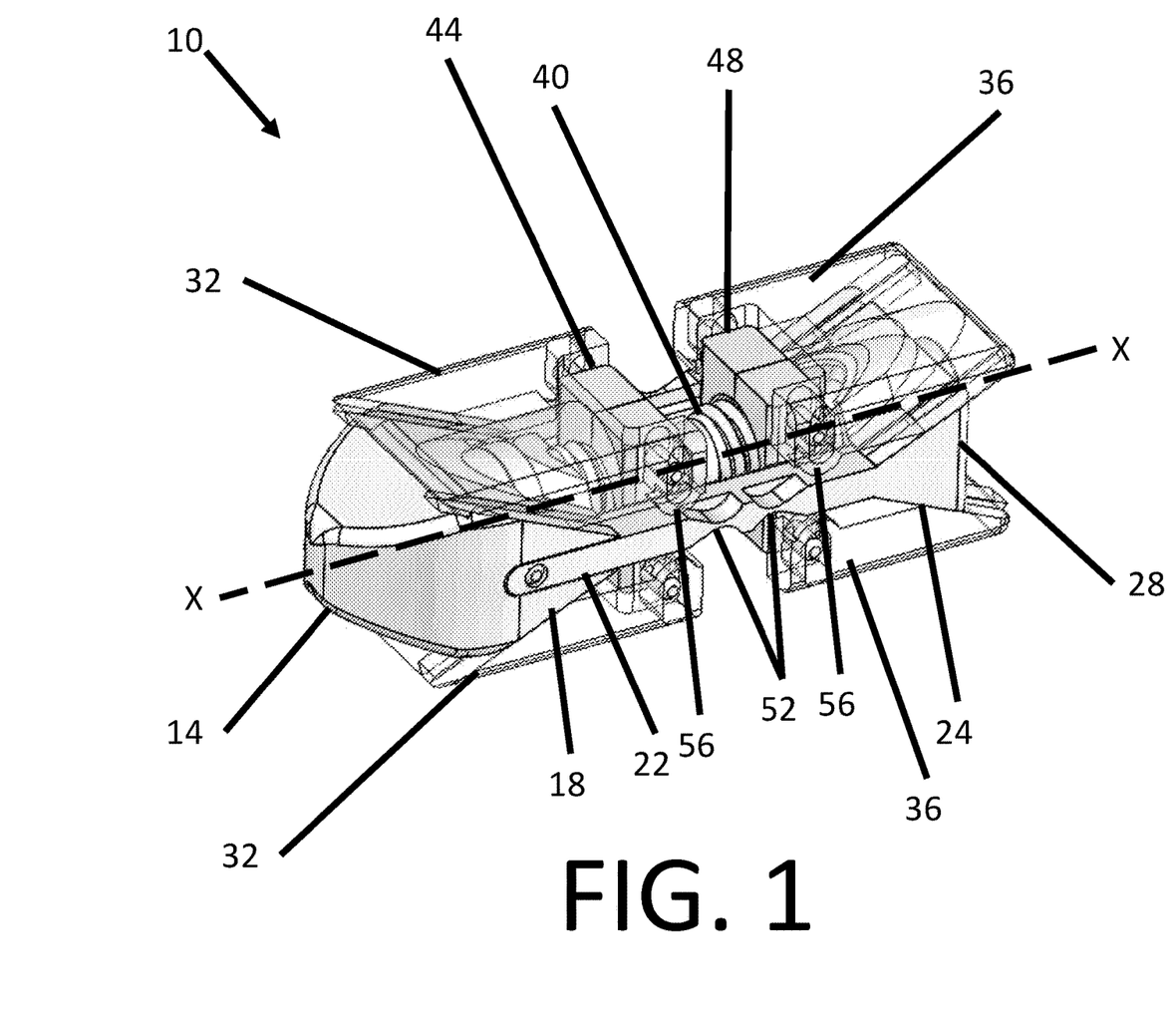
FIG. 1 is an oblique view of an implant according to the present disclosure from a distal perspective.

FIG. 1 illustrates an implant 10 according to an aspect of the disclosure. The implant 10 includes a chassis, an expandable system movably connected to the chassis, and a drive system manipulable to move the expandable system between contracted and expanded configurations.

The chassis may be any structure capable of retaining the expandable system and the drive system such that the expandable system may be driven by the drive system to transition from the contracted configuration to the expanded configuration, and, in some arrangements, to transition back from the expanded configuration to the contracted configuration. Within the foregoing, the chassis may be any structure having ramp surfaces at fixed locations along which elements of the expandable system may travel between the contracted configuration and the expanded configuration. The chassis of the illustrated arrangement includes a nose 14 defining a distal end of the implant 10, a proximal end 28, and two rods 22 on opposite sides of the chassis extending parallel to a central axis X of the chassis to connect the nose 14 to the proximal end 28, with only one of the rods 22 being visible from the perspective of FIG. 1. The rods 22 are rigid, and therefore hold the nose 14 and proximal end 28 at a fixed distance from one another.

The chassis also includes a distal wedge 18 and a proximal wedge 24. Each wedge 18, 24 may include two opposed ramp surfaces, with one ramp surface being on the superior side of the wedge and the other ramp surface being on the inferior side of the wedge.

The wedges 18, 24 are at fixed locations relative to each other and to the chassis overall. According to the illustrated arrangement, the distal wedge 18 is integral with the nose 14, and the proximal wedge 24 is integral with the proximal end 28, such that the rods 22 hold the wedges 18, 24 through the same action by which the rods 22 hold the nose 14 and proximal end 28 apart.

Figure 2:
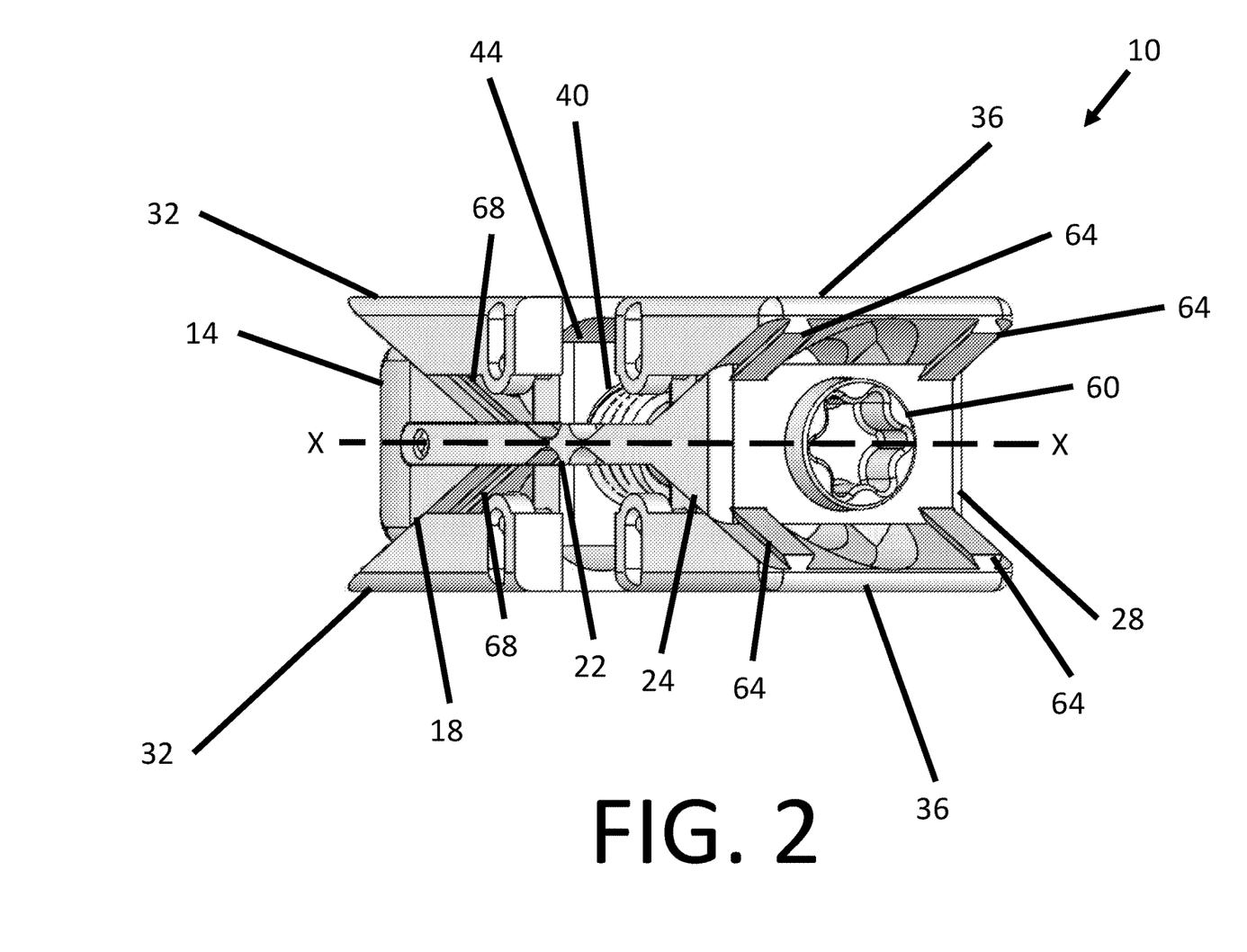
FIG. 2 is an oblique view of the implant of FIG. 1 from a proximal perspective.

The expandable system of the illustrated arrangement may include two distal endplates 32 on opposite sides of the distal wedge 18 and two proximal endplates 36 on opposite sides of the proximal wedge 24. Each of the endplates 32, 36 are movable between a respective contracted position relative to the chassis, corresponding to the contracted configuration of the implant 10 as a whole, and an expanded position relative to the chassis, corresponding to the expanded configuration of the implant 10 as a whole. Each of the endplates 32, 36 is constrained to translate parallel to a respective surface of the respective wedge 18, 22. Turning to FIG. 2, with continuing reference to FIG. 1, the endplates 32, 36 are each constrained to travel along their respective wedge surface by engagement of a track between each endplate and the respective wedge surface. For example, that track may take the form of a dovetail connection. In such an embodiment, the face of each of the endplates 32, 36 that faces the respective wedge face may include at least one (e.g., two) dovetail ribs 64 (only visible on the proximal endplates 36 from the perspective of FIG. 2) fitted into corresponding dovetail slots 68 on the respective wedge face (only visible on the distal wedge 18 from the perspective of FIG. 2). In an alternative embodiment, the dovetail ribs may be located on the wedge faces for engaging corresponding dovetail slots on the endplates. Thus, as the endplates 32, 36 travel along the central axis X, the endplates 32, 36 also travel toward or away from the central axis X at a rate dictated by the slope of the respective wedge face.

Figure 3:
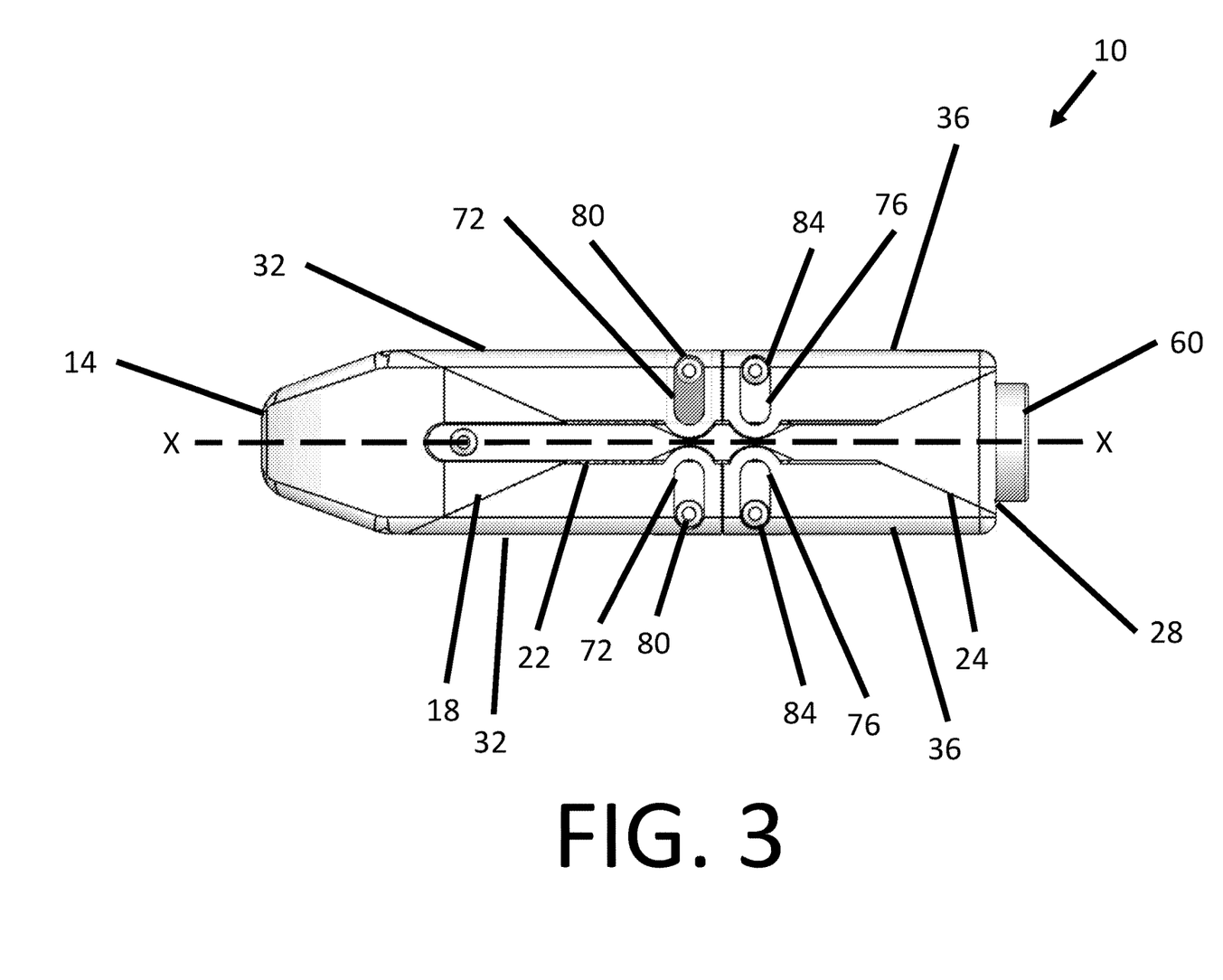
FIG. 3 is a side elevation view of the implant of FIG. 1 in a contracted configuration.
Figure 4:
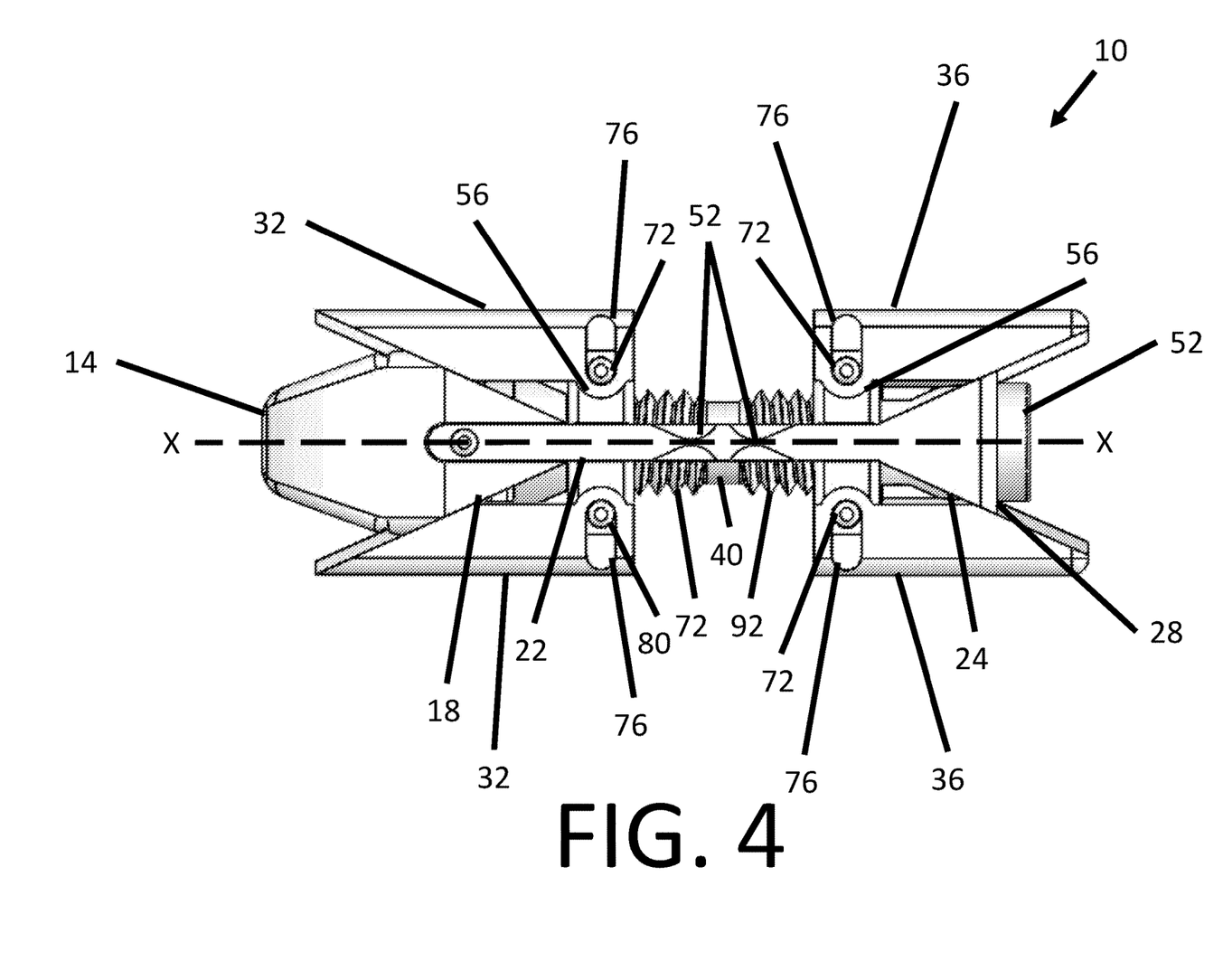
FIG. 4 is a side elevation view of the implant of FIG. 1 in an expanded configuration.

In a contracted position of the illustrated arrangement, shown in FIG. 3, the endplates 32, 36 fit together to form a contiguous surface with one another and with the nose 14, thus providing the implant 10 overall with a smooth capsule shape facilitating insertion of the implant 10 into an intended location within the patient. When the drive system is driven after delivery of the implant 10 to the intended location, the endplates 32, 36 move away from one another toward an expanded position shown in FIG. 4. The movement of the two distal endplates 32 in opposite directions away from the central axis X on the plane of FIGS. 3 and 4 and the movement of the two proximal endplates 36 in opposite directions away from the central axis X on the plane of FIGS. 3 and 4 causes the overall exterior shape of the implant to increase in height, defined perpendicular to the central axis X on the plane of FIGS. 3 and 4. The implant 10 may also increase in length, defined parallel to the central axis X, throughout the transition from the contracted configuration to the expanded configuration. For example, the proximal endplates 36 may travel proximally from the contracted position wherein the proximal most points of the proximal endplates 36 are flush with the proximal end 28 of the implant 10 to the expanded position wherein the proximal endplates 36 extend proximally beyond the proximal end 28 of the implant 10, as shown in FIG. 4. Such travel of the endplates 32, 36 along the central axis X and along stationary wedges 18, 24 may enable the length of the expanded configuration to exceed the length of the contracted configuration, thus enabling a greater ratio between an overall rectangular perimeter of the expanded configuration and the perimeter of the contracted configuration than certain other designs. Meanwhile, the implant 10 may maintain an equal width, defined perpendicular to the height and the central axis X, in both the contracted and expanded configurations. The wedges 18, 24 do not move relative to one another during the transition between the contracted position and the expanded position, so the chassis itself maintains an essentially constant shape and size in both configurations.

The constraint of the endplates 32, 36 to the respective faces of their respective wedges 18, 22 prevents the endplates 32, 36 from rotating in any direction or from travelling away from the central axis X without also travelling parallel to the central axis X. The constraint therefore reduces any chance for the endplates 32, 36 to move in unintended circumstances, such as by breaking the smooth capsule shape of the contracted configuration during insertion of the implant. Further, the constraint enables the implant 10 to be drawn back from the expanded configuration to the contracted configuration by using the drive system to pull the endplates 32, 36 to the narrower portions of their respective wedges. In alternative arrangements, the constraint may be accomplished by features other than the dovetail ribs 64 and slots 68 as illustrated, such as by any interlocking slidable geometry. In yet further alternative arrangements, the endplates 32, 36 may not be constrained to the wedges 18, 22.

As shown in FIG. 4, each of the endplates 32, 36 includes a protrusion 56 that extends, on a plane parallel to the perspective of FIGS. 3 and 4, toward the central axis X. The protrusions 56 are aligned with the slots 76, and thereby allow the slots 76 to extend further toward the central axis on the corresponding one of the planes parallel to the perspective of FIGS. 3 and 4. The rods 22 each include two recesses 52 to accommodate the protrusions 56, such that the entire profile of the rod-facing sides of each endplate 32, 36 may conform to the rods 22 when the implant 10 is in the contracted configuration. This nesting of the protrusions 56 into the recesses 52 may also act to make the endplates 32, 36 slightly more difficult to dislodge from their contracted positions as the implant 10 travels through tissue, thus aiding the implant 10 in retaining the smooth contour of the contracted configuration during initial positioning.

Returning to FIG. 1, the drive system of the illustrated arrangement includes a shaft 40 extending along the central axis X, a distal collar 44, and a proximal collar 48, with both collars 44, 48 being constrained to translation along the central axis X by encircling the shaft 40. The distal collar 44 is movably connected to the distal endplates 32, and the proximal collar 36 is movably connected to the proximal endplates 36. The collars 44, 48 are connected to their respective endplates 32, 36 such that the endplates 32, 36 can move relative to their respective collars 44, 48 toward or away from the central axis X, but the endplates 32, 36 cannot move relative to their respective collars 44, 48 along the central axis X. Thus, as the distal collar 44 travels along the shaft 40, the distal endplates 32 travel along the central axis X at the same rate while constrained to respective vectors parallel to the respective surfaces of the distal wedge 18.

Similarly, as the proximal collar 48 travels along the shaft 40, the proximal endplates 36 travel along the central axis X at the same rate while constrained to respective vectors parallel to the respective surfaces of the proximal wedge 22. Thus, in the illustrated arrangement, as the collars 44, 48 travel toward each other on the shaft 40, the endplates 32, 36 contract toward the central axis X, and as the collars 44, 48 travel away from each other on the shaft 40, the endplates 32, 36 expand away from the central axis X. The expandable system, and the implant 10 overall, can thereby transition between the contracted configuration shown in FIG. 3, wherein the collars 44, 48 abut one another at an approximate midpoint of the shaft 40, and the expanded configuration shown in FIG. 4, wherein the distal collar 44 abuts a proximal end of the distal wedge 18 and the proximal collar 48 abuts a distal end of the proximal collar 24.

With reference to FIG. 4, the shaft 40 includes a distal threaded portion 88 and a proximal threaded portion 92. The proximal threaded portion 92 may be threaded in an opposite direction to the distal threaded portion 88. The distal collar 44 and proximal collar 48 may likewise be internally threaded in opposite directions and threadingly engaged with the distal threaded portion 88 and the proximal threaded portion 92, respectively. Thus, turning the shaft 40 about the central axis X will drive the collars 44, 48 in opposite directions, either toward or away from one another. In the illustrated example, the shaft 40 is threaded such that turning the shaft 40 clockwise from a proximal perspective drives the collars 44, 48 apart and transitions the implant 10 to the expanded configuration, but in alternative arrangements, the shaft 40 may be threaded in the opposite direction. To facilitate such turning, the shaft 40 includes a drivable end 60 accessible from a proximal side of the implant 10. In the illustrated arrangement, the drivable end 60 extends proximally beyond the proximal end 28 of the implant 10, and includes a star shaped drive socket shown in FIG. 2. However, in other arrangements, the drivable end 60 may include any other geometry suitable for engagement with a corresponding driver, and may be flush with or recessed into the proximal end 28 of the implant 10. The implant 10 may also include one or more engagement features for securely connecting the implant to an insertion tool for positioning the implant in an intervertebral space. For example, the proximal end 28 of the implant 10 may include recesses located on opposing lateral sides of the central axis for engagement by protruding structures (e.g., grasping tines) of the insertion tool.

Turning back to FIGS. 3 and 4, the movable connection between the drive system and expandable system of the illustrated arrangement is provided by pegs 72, four of which extend from each of the collars 44, 48, each received in a corresponding one of two tracks 76 in each of the endplates 32, 36. The tracks 76 each have a width defined parallel to the central axis X that is approximately equal to a diameter of the pegs 72 and a length defined perpendicular to the central axis X that is greater than the diameter of the pegs 72. Thus, the pegs 72 can travel perpendicularly to the central axis X within the tracks 76, but can travel little or not at all parallel to the central axis X within the tracks 76. Because the collars 44, 48 are aligned on the shaft 40, the foregoing shape and size of the tracks 76 relative to the pegs 72 constrains the endplates 32, 36 to travel parallel to the central axis X along with their respective collars 44, 48 while allowing the endplates 32, 36 to travel perpendicular to the central axis X while the collars 44, 48 remain centered on the central axis X. However, in alternative arrangements, the connections between the collars 44, 48 and endplates 32, 36, or more generally between the drive system and expandable system, may be any other arrangement that permits the endplates 32, 36 to move orthogonally to the central axis X while being drivable along the central axis X by the drive system In alternative arrangements, the endplates 32, 36 and wedges 18, 24 may be at different orientations relative to one another, or may have different dimensions than those illustrated, so that the implant 10 changes along different dimensions between the contracted and the expanded configurations. For example, the distal wedge 18 and distal endplates 32 may be oriented at a position rotated 90° about the central axis X relative to the proximal wedge 24 and proximal endplates 36, causing the implant 10 overall to expand in both height and width in a transition from the contracted configuration to the expanded configuration.

In further alternative arrangements, the distal endplates 32 may be dimensioned to extend distally beyond the nose 14 in their expanded position, and/or the proximal endplates 36 and proximal wedge 24 may be respectively dimensioned such that the proximal endplates 36 do not extend proximally beyond the proximal end 26 in their expanded position. That is, contemplated alternative arrangements include those in which the proximal endplates 36 extend proximally of the proximal end 28 of the implant 10 and the distal endplates 32 extend distally of the nose 14 in their expanded positions, those in which the distal endplates 32 extend distally beyond the nose 14 in their expanded position but the proximal endplates 36 never extend proximally beyond the proximal end 28, and those in which the proximal endplates 36 never extend proximally beyond the proximal end 28 and the distal endplates 32 never extend distally beyond the nose 14 in any position.

In further alternative arrangements, either or both of the wedges 18, 24 may only have one ramped surface, meaning only an endplate 32, 36 travelling along one side of such a wedge 18, 24 would move toward or away from the central axis X when driven along the central axis X. The implant 10 overall would therefore only expand or contract in transition between the expanded and contracted configurations in one radial direction relative to the central axis X corresponding to the direction the ramped surfaces extend away from the central axis X. Such alternative arrangements may or may not also include endplates configured to travel parallel to the central axis X along un-ramped surfaces of the wedges. Similarly, in further alternative arrangements, each of the wedges 18, 24 may include any number of ramped surfaces greater than two, with additional endplates 32, 36 being included to travel along such additional ramped surfaces. In such further alternative arrangements, the wedges 18, 24 may have different axial cross-sectional geometries with respect to the central axis X, such as triangular, quadrilateral, pentagonal, hexagonal, etc. to provide the corresponding number of sides. In any of the foregoing arrangements, the ramped surfaces may vary in inclination or slope between different wedges or between different sides of a given wedge, and may even be non-linear in profile.

In yet further alternative arrangements, a number of endplates 32, 36 per collar 44, 48 and wedge 18, 24 may vary. Such variation may be independent of or in lockstep with the number of ramped surfaces per wedge 18, 24, and the number of proximal endplates 36 may be varied independently of the number of distal endplates 32. Thus, while the illustrated arrangement includes two proximal endplates 36 and two distal endplates 32, some alternative arrangements include one, three, four, or more proximal endplates 36 and distal endplates 32. Alternative arrangements may also include only one collar, or more than two collars, coupled to the shaft 40, with any number of endplates connected to each collar.

In the illustrated arrangement, the wedges 18, 24 are oriented in opposite directions and taper toward one another, but in alternative arrangements the wedges 18, 24 may be oriented otherwise, such as to taper in the same direction or to taper away from one another, as appropriate to cooperate with alternative arrangements of the expandable system. The threaded portions 88, 92 would be threaded in the same or different directions as necessary given the relative positions and orientations of the wedges 18, 24 in these alternative arrangements for the endplates 32, 36 to travel in the intended directions relative to one another as the shaft 40 is rotated. For example, in an arrangement wherein both wedges 18, 24 are oriented to taper in the same direction along the central axis X, the threaded portions 88, 92 may be threaded in the same direction so that the endplates all move toward or away from the central axis X, when the shaft 40 is rotated.

Because, in alternatives to the illustrated arrangement, the wedges may vary in number and orientation, and may have independently varying numbers, positions, and slopes of ramped surfaces, and because the number of collars and endplates may also be varied in accordance to the wedges, it is possible to create implants according to the general principles of the foregoing disclosure that expand in an asymmetric manner between from the contracted configuration to the expanded configuration. Such implants may be custom designed, and even patient specific in mechanics and proportion, according to the needs of a particular patient. Such implants may be useful for, for example, imposing a lordotic correction between adjacent vertebrae. In one specific example, in an implant designed for posterior lumbar interbody fusion (PLIF), in which the implant is positioned into the intervertebral space along a posterior to anterior direction, the ramp surface(s) of the distal wedge 18 may be inclined more steeply than those of the proximal wedge 24, so as to impose increased lordosis on the adjacent vertebrae.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The inventio claimed is:

1. An intervertebral implant comprising:
   a chassis including a wedge;
   an endplate connected to the chassis and movable relative to the chassis along a surface of the wedge between a contracted position and an expanded position, the expanded position being farther from a central axis defined relative to the chassis than the contracted position, with the wedge remaining at a constant position along the central axis in both the expanded position and contracted position; and
   a collar translatable along the central axis relative to the wedge to drive movement of the endplate relative to the chassis along the surface of the wedge between the contracted and expanded positions, the collar being connected to the endplate so as to permit the endplate and the collar to translate relative to one another in a direction orthogonal to the central axis but restrict the endplate and the collar from translating relative to one another along a direction parallel to the central axis.

2. The implant of claim 1, comprising a threaded shaft in threaded driving engagement with the endplate, and connected to the chassis such that the shaft extends along and is rotatable about the central axis.

3. The implant of claim 2, wherein the endplate is a first endplate and the implant further comprises a second endplate with which the threaded shaft is in threaded driving engagement such that rotation of the shaft about the central axis drives the first endplate and second endplate in a same direction along the central axis.

4. The implant of claim 3, wherein the second endplate is connected to the chassis and movable relative to the chassis along another surface of the wedge between a contracted position and an expanded position, the expanded position of the second endplate being farther from the central axis than the contracted position of the second endplate.

5. The implant of claim 3, wherein the collar is internally threaded so as to be threadingly engaged with the shaft, the collar being connected to the first endplate and second endplate to provide the threaded driving engagement of the shaft with the first endplate and second endplate.

6. The implant of claim 5, wherein:
   the wedge is a first wedge;
   the collar is a first collar threaded onto a first threaded portion of the shaft;
   the chassis further includes a second wedge; and
   the implant further includes a third endplate and fourth endplate and a second collar;
   the third endplate and the fourth endplate each being connected to the chassis and movable relative to the chassis along a respective surface of the wedge between a respective contracted position and a respective expanded position, the respective expanded positions being farther from the central axis than the respective contracted positions; and
   the second collar being threaded onto a second threaded portion of the shaft, translatable relative to the second wedge, and connected to the third endplate and fourth endplate to provide threaded driving engagement of the shaft with the third endplate and the fourth endplate.

7. The implant of claim 6, wherein the first threaded portion is threaded in an opposite direction from the second threaded portion.

8. The implant of claim 2, wherein the collar is internally threaded so as to be threadingly engaged with the shaft the collar being connected to the endplate to provide the threaded driving engagement of the shaft with the endplate.

9. The implant of claim 8, wherein the endplate can translate relative to the collar farther in a direction perpendicular to the central axis than in a direction parallel to the central axis.

10. The implant of claim 1, wherein the endplate includes a track extending perpendicular to the central axis and the collar includes a peg received in the track.

11. The implant of claim 10, wherein the implant is configured for the track and peg to travel along the central axis along with the collar.

12. An intervertebral implant comprising:
    a chassis including a first wedge and a second wedge spaced apart from one another along a central axis; and
    a pair of first endplates and a pair of second endplates each connected to the chassis and movable relative to the chassis between a contracted configuration of the implant and an expanded configuration of the implant, wherein each of the first endplates is movable along a respective surface of the first wedge and each of the second endplates is movable along a respective surface of the second wedge, such that each of the first endplates and each of the second endplates are farther from the central axis in the expanded configuration than in the contracted configuration, and the first endplates move away from the second endplates along the central axis when moving from the contracted configuration to the expanded configuration,
    wherein the first and second wedges are each located at a constant position along the central axis in both the contracted configuration and the expanded configuration.

13. The implant of claim 12, comprising a first collar to which the first endplates are connected and a second collar to which the second endplates are connected, the first and second collars being simultaneously translatable along the central axis relative to the chassis.

14. The implant of claim 12, wherein the surfaces of the first wedge, along which the first endplates are movable, mirrors the surfaces of the second wedge, along which the second endplates are movable.

15. The implant of claim 12, wherein each of the first endplates is connected to the respective surface of the first wedge along which the first endplates may move and each of the second endplates is connected to the respective surface of the second wedge along which the second endplates may move such that each of the first and second endplates are constrained to moving only along the respective surface.

16. The implant of claim 12, wherein the pair of first endplates are a distal pair of endplates and the pair of second endplates are a proximal pair of endplates, and wherein the distal pair of endplates are at more distal positions and the proximal pair of endplates are at more proximal positions in the expanded configuration than in the contracted configuration.

17. The implant of claim 12, wherein the chassis includes two rods extending parallel to the central axis to hold the first and second wedges at their respective fixed positions.

18. The implant of claim 12, wherein the pair of first endplates are translatable together along the central axis while moving away from one another on opposing sides of the first wedge, and wherein the pair of second endplates are translatable together along the central axis while moving away from one another on opposing sides of the second wedge.

19. An intervertebral implant comprising:
a chassis including a first wedge and a second wedge spaced apart from one another along a central axis;
a threaded shaft connected to the chassis such that the shaft extends along and is rotatable about the central axis; and
a first endplate and a second endplate each connected to the threaded shaft such that, upon rotation of the threaded shaft about the central axis, the first and second endplates are movable relative to the chassis along a respective surface of a respective one of the first and second wedges between a contracted configuration of the implant and an expanded configuration of the implant, the first and second endplates being farther from the threaded shaft in the expanded configuration than in the contracted configuration, and the first endplate moves away from the second endplate along the central axis when moving from the contracted configuration to the expanded configuration,
wherein the first and second wedges are each located at a constant position along the central axis in both the contracted configuration and the expanded configuration.

20. The implant of claim 19, wherein the first endplate and the second endplate are each connected to the threaded shaft via a respective internally threaded collar threadingly engaged with the shaft.

* * * * *